(12) United States Patent
Ho

(10) Patent No.: US 8,092,225 B1
(45) Date of Patent: Jan. 10, 2012

(54) DEVICE FOR HELPING A TODDLER LEARN TO WALK

(76) Inventor: GingToe Ho, Brooklyn, NY (US)

( * ) Notice: Subject to any disclaimer, the term of this patent is extended or adjusted under 35 U.S.C. 154(b) by 242 days.

(21) Appl. No.: 12/655,309

(22) Filed: Dec. 29, 2009

(51) Int. Cl.
*G09B 19/00* (2006.01)

(52) U.S. Cl. .................................................. 434/255

(58) Field of Classification Search .......... 434/247, 434/253, 255; 119/770; 482/69
See application file for complete search history.

(56) References Cited

U.S. PATENT DOCUMENTS

| | | | |
|---|---|---|---|
| 4,907,972 A | 3/1990 | Marolda | 434/255 |
| 5,356,355 A | 10/1994 | Campbell | 482/43 |
| 5,476,070 A * | 12/1995 | Gwon et al. | 119/770 |
| 5,498,219 A | 3/1996 | Soufi | 482/69 |
| 5,638,772 A * | 6/1997 | Kaufmann et al. | 119/770 |
| D383,256 S * | 9/1997 | Hampton | D30/153 |
| D426,065 S * | 6/2000 | Deveaux | D3/327 |
| 6,196,949 B1 | 3/2001 | Rodarte | 482/69 |
| 6,325,023 B1 | 12/2001 | Elnatan | 119/770 |
| 6,361,478 B1 * | 3/2002 | Giancaspro | 482/69 |
| 6,651,594 B1 * | 11/2003 | Bagwell | 119/770 |
| 6,827,672 B2 | 12/2004 | Miceli | 482/69 |
| 6,836,902 B2 * | 1/2005 | Marquez et al. | 2/69 |
| 6,910,993 B1 | 6/2005 | Baran | 482/69 |
| 7,017,525 B2 * | 3/2006 | Leach | 119/770 |
| 7,341,025 B1 * | 3/2008 | Streeter et al. | 119/857 |
| 7,516,717 B2 * | 4/2009 | David et al. | 119/770 |
| 7,900,586 B2 * | 3/2011 | Hamblen | 119/770 |

* cited by examiner

*Primary Examiner* — Kurt Fernstrom
(74) *Attorney, Agent, or Firm* — Goldstein Law Office P.C.

(57) ABSTRACT

A device for helping a toddler learn to walk that employs a waist belt for a toddler, a waist belt for an adult and a strap assembly that connects the toddler belt and the adult belt. The strap assembly has an adjustable strap, a connecting strap and a strap loop. The adjustable strap has a plurality of button-holes, a button fastener and hook and loop fastener material on the inner surfaces. The adjustable strap is attached to the toddler belt, doubles through a strap loop, and fixes a length by securing a button in a buttonhole and linking the hook and loop fastener material on the inside surfaces of the adjustable strap. The device allows the adult to support the toddler without engaging the adult's hands or the toddler's hands and allows the adult to remain in a full upright position to avoid strain on the lower back.

6 Claims, 4 Drawing Sheets

DEVICE FOR HELPING A TODDLER LEARN TO WALK

BACKGROUND OF THE INVENTION

The invention relates generally to a device for helping a toddler learn to walk. More particularly, the present invention relates to a device enabling an adult to teach a toddler how to walk while remaining upright with the adult's hands free and without stress to the adult's lower back.

When children begin to walk, typically they grab onto an adult's fingers—lifting themselves up while holding on tightly. The adult often leans forward and supports the child by allowing the child to balance himself by holding onto each of the adult's hands with one of his own. The adult is thereby able to allow the infant to place weight on its feet while restraining the infant from falling. The child, either facing forward or facing the adult, takes steps, lifting one foot at a time and placing it down on the floor, with the adult providing the necessary support and balance. This age-old method of teaching an infant to walk, however, is not well suited to the adult's physical well being. Because of the small height of the infant as compared to the adult, the adult is bent forward. After a period of time the adult may experience discomfort from walking in such an awkward position.

Another problem is that neither the toddler nor the adult can hold anything in their hands nor manipulate any objects in the environment. Many young children need to carry a transitional object—something that a child uses to aid their feeling of security. Adults need to manipulate objects such as light switches, doorknobs, or latches. Adults may need to carry in their hands items such as purses, keys, bags, and cell phones, especially when the adult and toddler are outside the home. This presents a dilemma for the adult when the toddler insistently demands help in learning to walk at a time that the adult needs to carry an item or manipulate an object.

Devices have been used to train toddlers to walk such as walkers that do not directly involve the person of the adult. However, these devices have significant safety issues. The Consumer Product Safety Commission (CPSC) estimates that each year there are 21,300 hospital emergency room treated injuries associated with baby walkers for children under 15 months of age. CPSC also receives one to two reports per year of deaths from using baby walkers.

Other devices have been used that involve a halter or a harness around the child's lower body. These devices require that the adult use one or two hands on a crossbar, handle, grip, or strap attached to the halter, thus not allowing both hands of the adult to be free.

While these devices may be suitable for the particular purpose employed, or for general use, they would not be as suitable for the purposes of the present invention as disclosed hereafter.

SUMMARY OF THE INVENTION

It is an object of the invention to produce a device for helping a toddler learn to walk by stabilizing the child in an upright position. Accordingly, the device provides a toddler belt attached to a waist of the toddler, joined to an adult by a strap assembly to support the child in an upright position.

It is another object of the invention to produce a device for helping a toddler learn to walk that allows the adult to support the toddler while leaving the adult's hands free. Accordingly, the device provides the adult belt that goes around the waist of the adult attached by the strap assembly to the toddler belt around the child's waist, leaving the adult's hands free.

It is a further object of the invention to produce a device for helping a toddler learn to walk that adjusts as the toddler grows or for use by different adults. Accordingly, the device provides a strap assembly with a connecting strap, an adjustable strap and a strap loop. The adjustable strap has a plurality of buttonholes, a button fastener and hook and loop fastener material on its inner surfaces. The adjustable strap is attached to the toddler belt, doubles through a strap loop, and fixes a length by securing a button in a buttonhole and linking the hook and loop fastener material on the inside surfaces of the adjustable strap. The strap assembly connects the adult belt to the toddler belt so that the adult can stand and walk in an upright position without holding the child's hands, leaving the adult's hands free.

The invention is a device for helping a toddler learn to walk that employs a waist belt for a toddler, a waist belt for an adult and a strap assembly that connects the toddler belt and the adult belt. The strap assembly has an adjustable strap, a connecting strap and a strap loop. The adjustable strap has a plurality of buttonholes, a button fastener and hook and loop fastener material on its inner surfaces. The adjustable strap is attached to the toddler belt, doubles through a strap loop, and fixes a length by securing a button in a buttonhole and linking the hook and loop fastener material on the inside surfaces of the adjustable strap. The device allows the adult to support the toddler without engaging the adult's hands or the toddler's hands and allows the adult to remain in a full upright position to avoid strain on the lower back.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
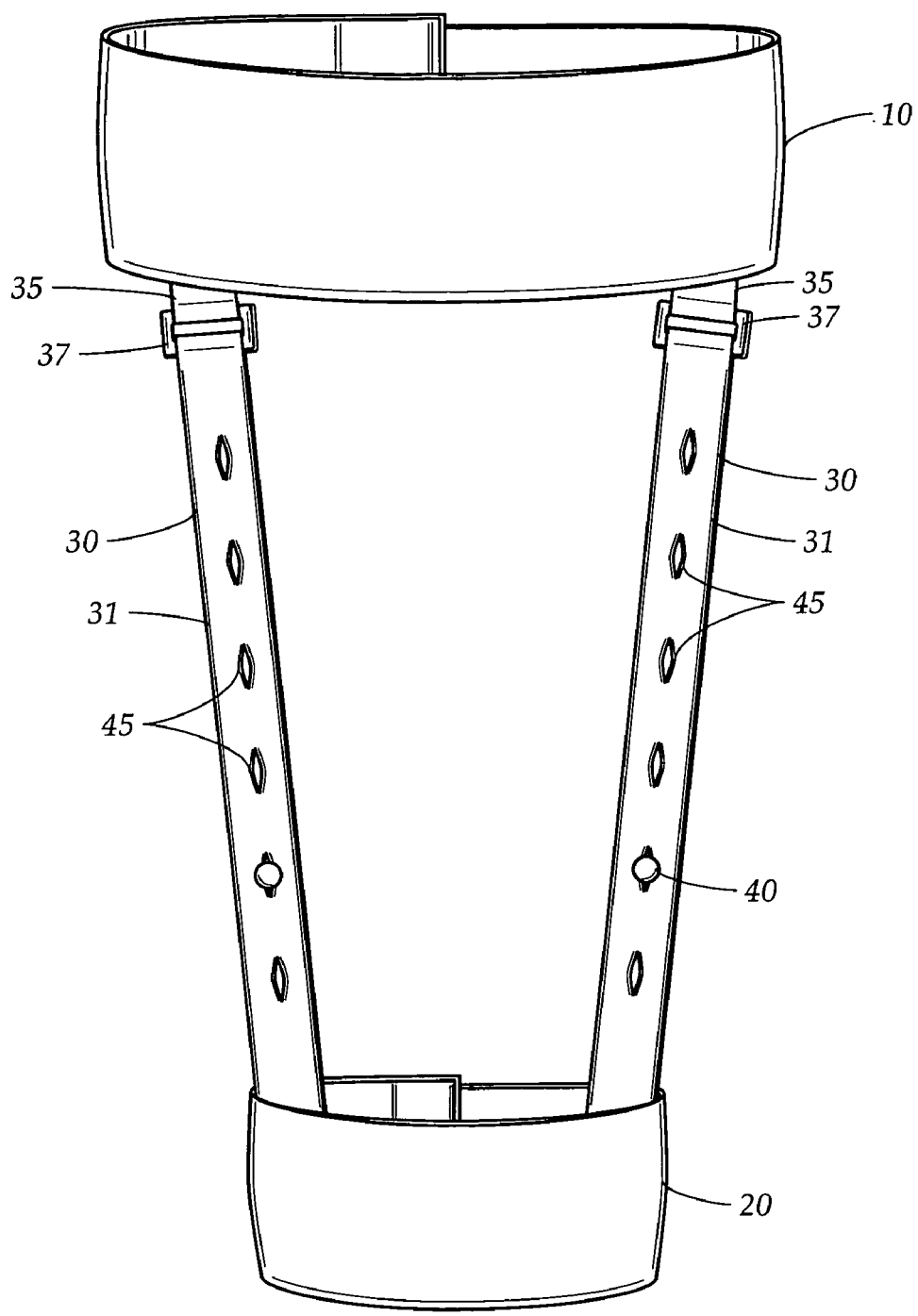
FIG. 1 is a diagrammatic perspective view of the invention from the front, illustrating a toddler belt, an adult belt, and a pair of strap assemblies.

FIG. 1 illustrates a device to allow an adult to help a toddler learn to walk. The toddler, for the purpose of this discussion, is a young child in late infancy or early childhood who is learning how to walk, generally between the ages of eight and fifteen months. The invention includes a toddler belt 20, an adult belt 10 and a pair of strap assemblies 30 connecting the toddler belt 20 to the adult belt 10. The pair of strap assemblies each have an adjustable strap 31, a connecting strap 35, and a strap loop 37. The adjustable straps 31 each have a button fastener 40, a plurality of buttonholes 45 and hook and loop material on an inside surface, shown in FIG. 4A and FIG.

4B. Still referring to FIG. 1, the adjustable strap 31 attached to the toddler belt 20 and the connecting strap 35 attached to the adult belt 10 are joined together by the strap loop 37, whereby the adult belt 10 and the toddler belt 20 are thus connected.

Figure 3:
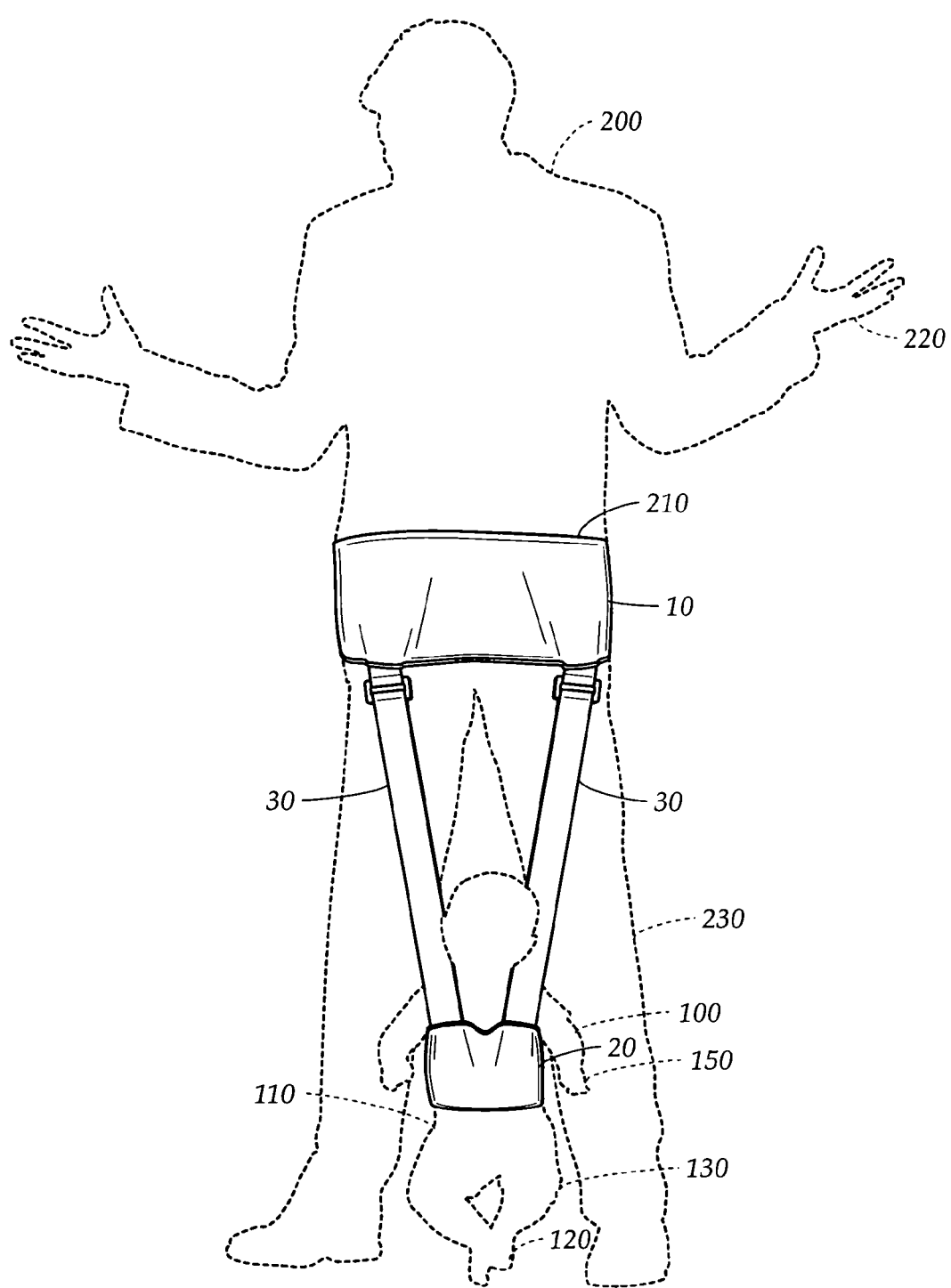
FIG. 3 is a front elevational view of the invention in use by a toddler and an adult.

Referring now to FIG. 3, the illustration demonstrates the toddler 100 and the adult 200 employing the device to help the toddler 100 learn to walk. The toddler 100 has a waist 110, a pair of legs 130 and a pair of feet 120 at the distal end of the legs 130, and a pair of hands 150. The adult 200 has a waist 210, a pair of legs 230 and a pair of hands 220. The adult belt 10 is secured around the waist 210 of the adult 200 and the toddler belt 20 is secured around the waist 110 of the toddler 100. The pair of strap assemblies 30 offsets the difference in size between the adult 200 and the toddler 100, the adult 200 having legs 230 that generally are longer than the height of the toddler 100. In order to allow the adult 200 to remain in a full upright position, the strap assemblies 30 provide the balance and support to the toddler 100 rather than the hands 220 of the adult grasping the hands 150 of the toddler 100. The pair of strap assemblies 30 are adjusted so that the toddler's feet 120 touch the floor and the toddler's legs 130 are bearing weight.

To employ the device, the adult 200 secures the toddler belt 20 around the toddler's waist 110, then secures the adult belt 10 around his own waist 210. Alternatively, the adult 200 secures the adult belt 10 around his own waist 210 first. The adult 200 adjusts the strap assemblies 30 such that the toddler's feet 120 can touch the ground and the adult 200 is upright. The toddler 100 then takes a step with one foot 120, the device providing support and balance. The toddler 100 then takes another step with the other foot 120, and the adult 200 takes a small step or two to stay within the distance slightly less than the length of the strap assemblies 30 so that the toddler's feet 120 remain on the ground, the toddler's legs 130 supporting the toddler's weight. In one embodiment, the toddler 100 and the adult 200 are both facing and walking forward. The hands 220 of the adult 200 and the hands 150 of the toddler 100 are free to carry or manipulate objects. The adult 200 is in a full upright position, without strain on his back, looking straight ahead. In one embodiment, the toddler 100 and adult 200 face each other, the adult 200 walking backwards, in a full upright position. When finished with the exercise, the adult 200 removes the adult belt 10 and the toddler belt 20, making sure that the toddler 100 is in a safe place and position.

Figure 4A:
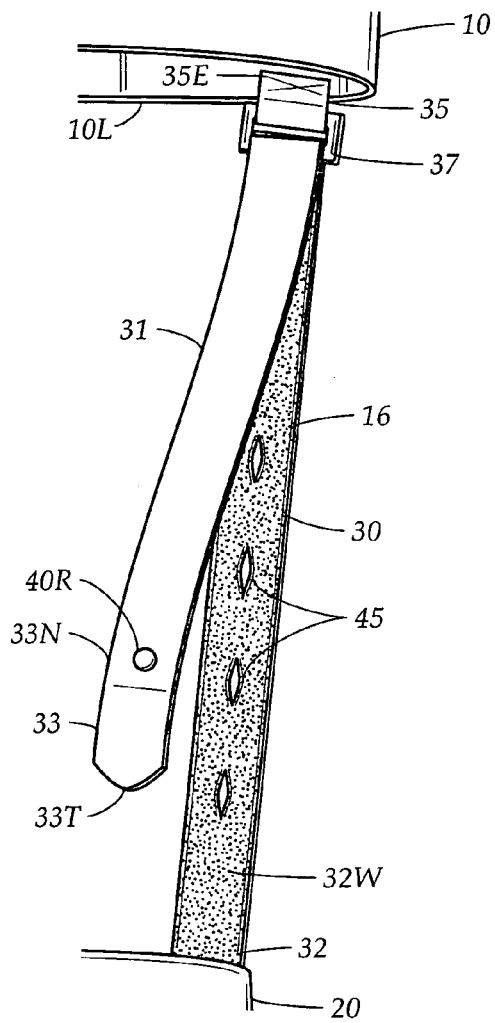
FIG. 4A is a diagrammatic perspective view of the strap assembly from the back, with an end portion of an adjustable strap separated to show an inside surface.

FIG. 4A shows the strap assembly 30 in detail, as seen from the back of the device. The adjustable strap 31 has a first end portion 32, and a second end portion 33. The first end portion has an inside surface 32N and the second end portion has an inside surface 33N. On the inside surface 32N of the first end portion 32 of the adjustable strap 31 is hook and loop fastener material 16 that surrounds the plurality of buttonholes 45. The second end portion 33 of the adjustable strap 31 passes through the strap loop 37, which doubles the adjustable strap 31, so that the inside surface 33N of the second end portion 33 faces the inside surface 32N of the first end portion 32 of the adjustable strap 31. The adult belt 10 has an inside lower edge 10L. The connecting strap 35 has a pair of end portions 35E, a first end portion and a second end portion, which are attached to the adult belt 10 near the inside lower edge 10L, the first end portion 35E passing through the strap loop 37 before being attached together with the second end portion 35E to the adult belt inside lower edge 10L.

Figure 4B:
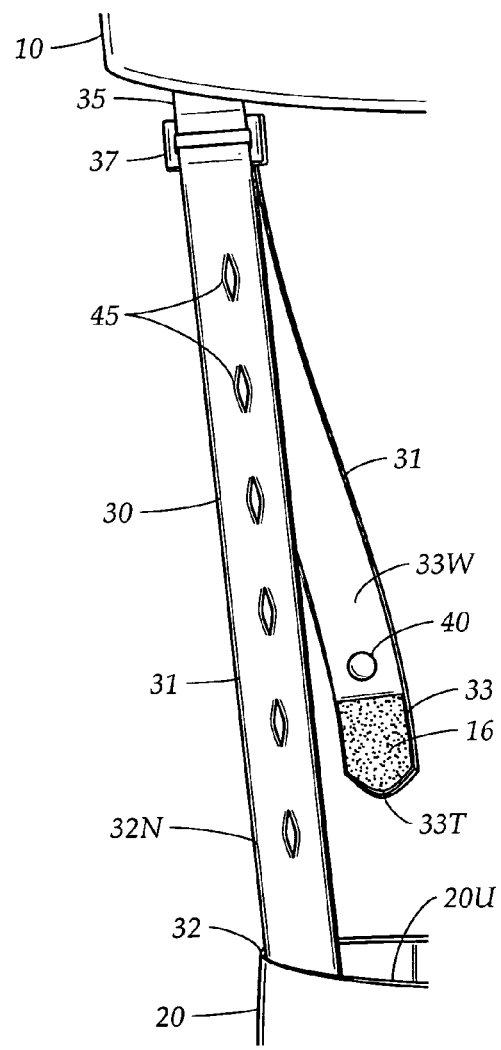
FIG. 4B is a diagrammatic perspective view (similar to FIG. 4A) from the front, illustrating the strap assembly.

FIG. 4B, similar to FIG. 4A, shows the adjustable strap 31 as seen from the front of the device. The toddler belt 20 has an inside upper edge 20U. The adjustable strap 31 has the first end portion 32 attached to the toddler belt 20 near the inside upper edge 20U of the toddler belt, the first end portion 32 overlapping with the inside upper edge 20U. The button fastener 40 is on the inside surface 33N of the second end portion 33 of the adjustable strap 31. The second end portion has a tip 33T. Below the button fastener 40, there is hook and loop fastener material 16 covering the inside surface 33N at the tip 33T of the second end portion 33. Hook and loop material has a hook surface form and a loop surface form. It is inconsequential which end portion of the adjustable strap has which hook and loop material form as long as the inside surface 32N at the first end portion 32 has one form and the inside surface 33N at the tip 33T of the second end portion has the other form. The button fastener 40 is, for example, but not limited to, a button, a rivet or a snap button with or without a back 40R. The back 40R, which is shown in FIG. 4A, is for example, but not limited to, a stay button, a rivet buck-tail or a snap button underpart.

To adjust the adjustable strap 31, the adult selects a specific buttonhole 45 to lengthen or shorten the adjustable strap 31 to an appropriate length, fastens the button fastener 40 in the selected buttonhole 45 and links hook and loop fastener material 16 on the inside surface of the tip 33T of the second end portion 33 of the strap to hook and loop fastener material 16 on the inside surface 32N of the first end portion 32 of the adjustable strap 31. By using two systems of fastening, button fasteners 40 and hook and loop fastener material 16, the adjustable strap 31 is more sturdy and secure when it is doubled through the strap loop 37.

Figure 2:
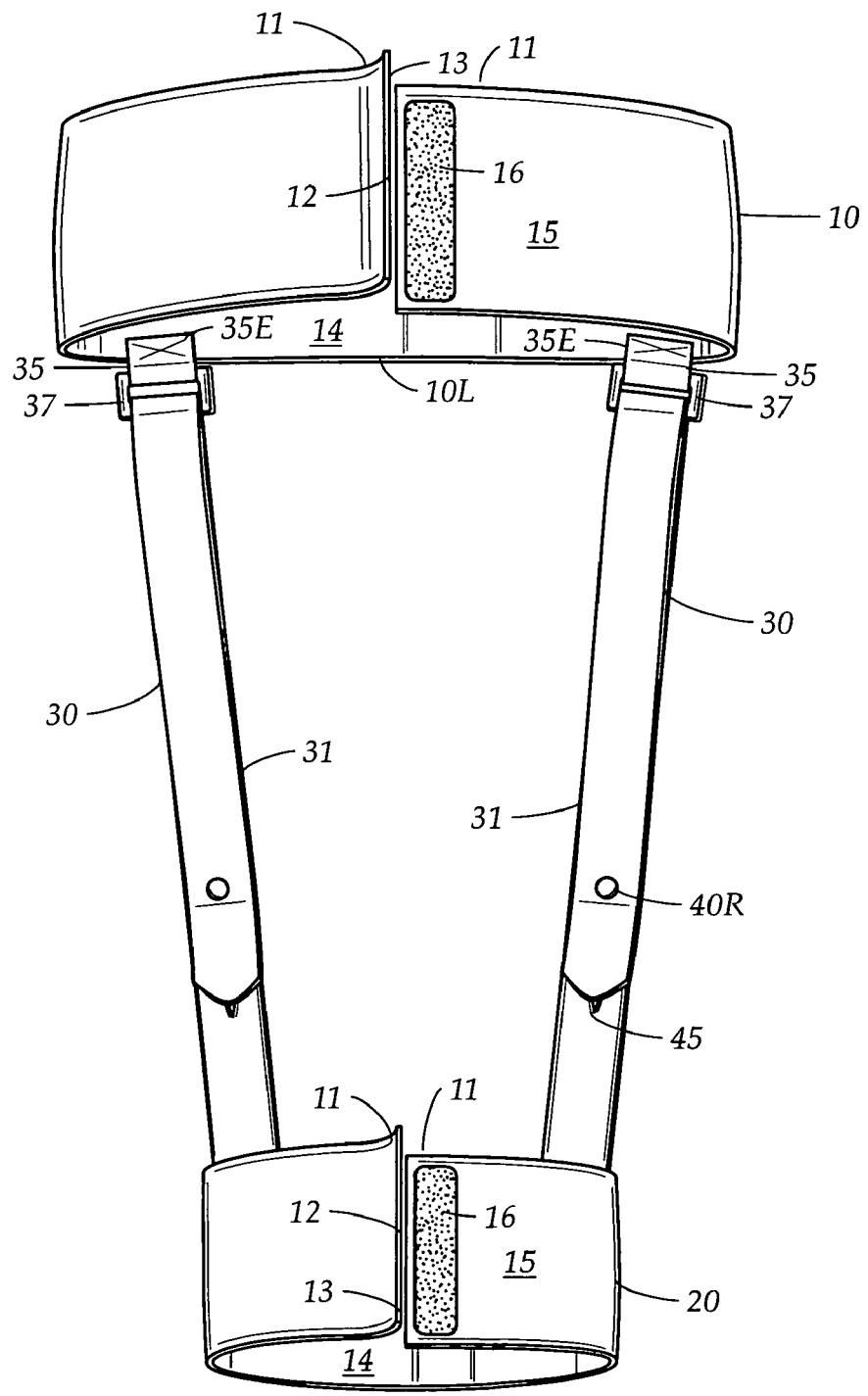
FIG. 2 is a diagrammatic perspective view of the invention from the back, illustrating a closure on the adult belt in an open position.

FIG. 2 shows the device as viewed from the back. The adult belt 10 and the toddler belt 20 each have a first end 12, a second end 13, an inside surface 14 and an outside surface 15. Hook and loop fastener material 16 is placed close to the edge on the first end 12 of the belts on the inside surface 14 and close to the edge on the second end 13 on the outside surface 15 to form a closure 11 to secure the belts in the back. It is insignificant which belt surface has which hook and loop material surface as long as the inside surface 14 has one form and the outside surface 15 has the other form. The hook and loop closures 11 allow the adult to easily secure the toddler belt 20 to the child's waist and the adult belt 10 to his person. Hook and loop closures 11 also allow quick removal for both convenience and safety. In one embodiment, the adult belt 10 and the toddler belt 20 are padded for comfort.

In conclusion, herein is presented a device for helping a toddler learn to walk. The invention is illustrated by example in the drawing figures, and throughout the written description. It should be understood that numerous variations are possible, while adhering to the inventive concept. Such variations are contemplated as being a part of the present invention.

What is claimed is:

1. A device for allowing an adult having a waist, to help a toddler having a waist learn to walk, comprising:
    a toddler belt for attaching around the waist of the toddler, having a top inside edge;
    an adult belt for attaching around the waist of the adult, having a bottom inside edge; and
    a pair of strap assemblies, each strap assembly having an adjustable strap, a connecting strap, and a strap loop, the adjustable strap having a first end portion and a second end portion, the first end portion having an inside surface and a plurality of buttonholes, and the second end portion having a tip with an inside surface, and a button fastener on the second end portion near the tip, hook and loop fastener material on the inside surface of the first end portion surrounding the plurality of buttonholes, hook and loop fastener material on the inside surface of the tip of the second end portion, the inside surface of the first end portion attaching to the toddler belt near the top inside edge, and the second end portion passing through the strap loop and fixable in length by securing the button fastener in one of the buttonhole and linking the hook and loop material on the inside surface of the first end portion to the hook and loop material on the inside surface on the tip the second portion, the connecting strap having a pair of end portions, an end portion passing through the strap loop, the pair of end portions attached together near the bottom inside edge of the adult belt, the strap loop joining the adjustable strap and the connecting strap.

2. The device as described in claim 1, wherein the toddler belt and the adult belt are padded.

3. The device as described in claim 1, wherein the toddler belt and the adult belt have a hook and loop fastener material closure for selectively securing around the toddler and adult, respectively.

4. A method of helping a toddler learn to walk, the toddler having a waist, for use by an adult with a waist using a device having a toddler belt, an adult belt and a pair of strap assemblies connecting the toddler belt and the adult belt, a strap assembly having an adjustable strap with a pair of end portions, the first end portion having an inner surface and a plurality of buttonholes surrounded by hook and loop fastener material and the second end portion having a inner surface, a tip with an inner surface of hook and loop fastener material and a button fastener above the tip, comprising the steps of:

securing the toddler belt around a toddler's waist and the adult belt around an adult's waist;

adjusting the pair of strap assemblies connecting the toddler belt and the adult belt by selecting a buttonhole on the first end portion of the adjustable strap to lengthen or shorten the strap, securing the button fastener on the second end portion of the adjustable strap into the selected buttonhole and linking hook and loop material on the inside surface of the first end portion of the adjustable strap to hook and loop material on the inside surface of the tip of the adjustable strap;

walking with the toddler by the adult, the toddler supported from the waist of the adult, the toddler taking steps while the adult walks upright without holding the toddler's hands; and removing the toddler belt from the toddler's waist and the adult belt from the adult's waist.

5. The method as described in claim 4, wherein during the step of walking with the toddler by the adult, the adult and the toddler are both facing and walking forward.

6. The method as described in claim 4, wherein during the step of walking with the toddler by the adult, the adult and the toddler are facing each other, the adult walking backward and the toddler walking forward.

* * * * *